Dec. 1, 1953 E. P. SEXTON 2,661,246
FLUID PRESSURE BRAKE APPARATUS
Filed Aug. 22, 1950 2 Sheets-Sheet 2
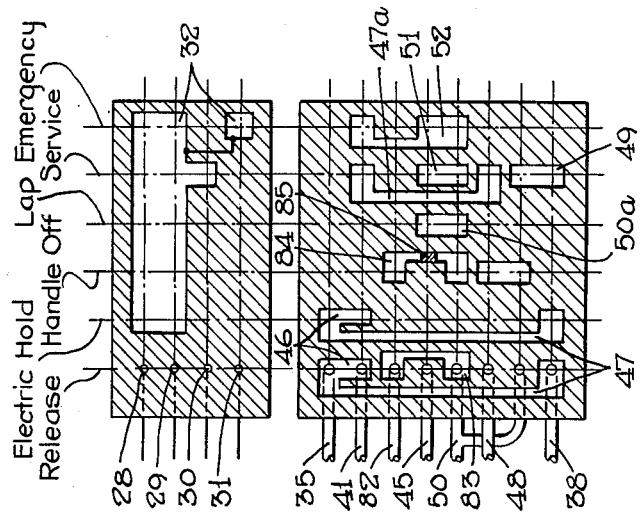
INVENTOR.
Everett P. Sexton
BY
Frank E. Miller
ATTORNEY Patented Dec. 1, 1953

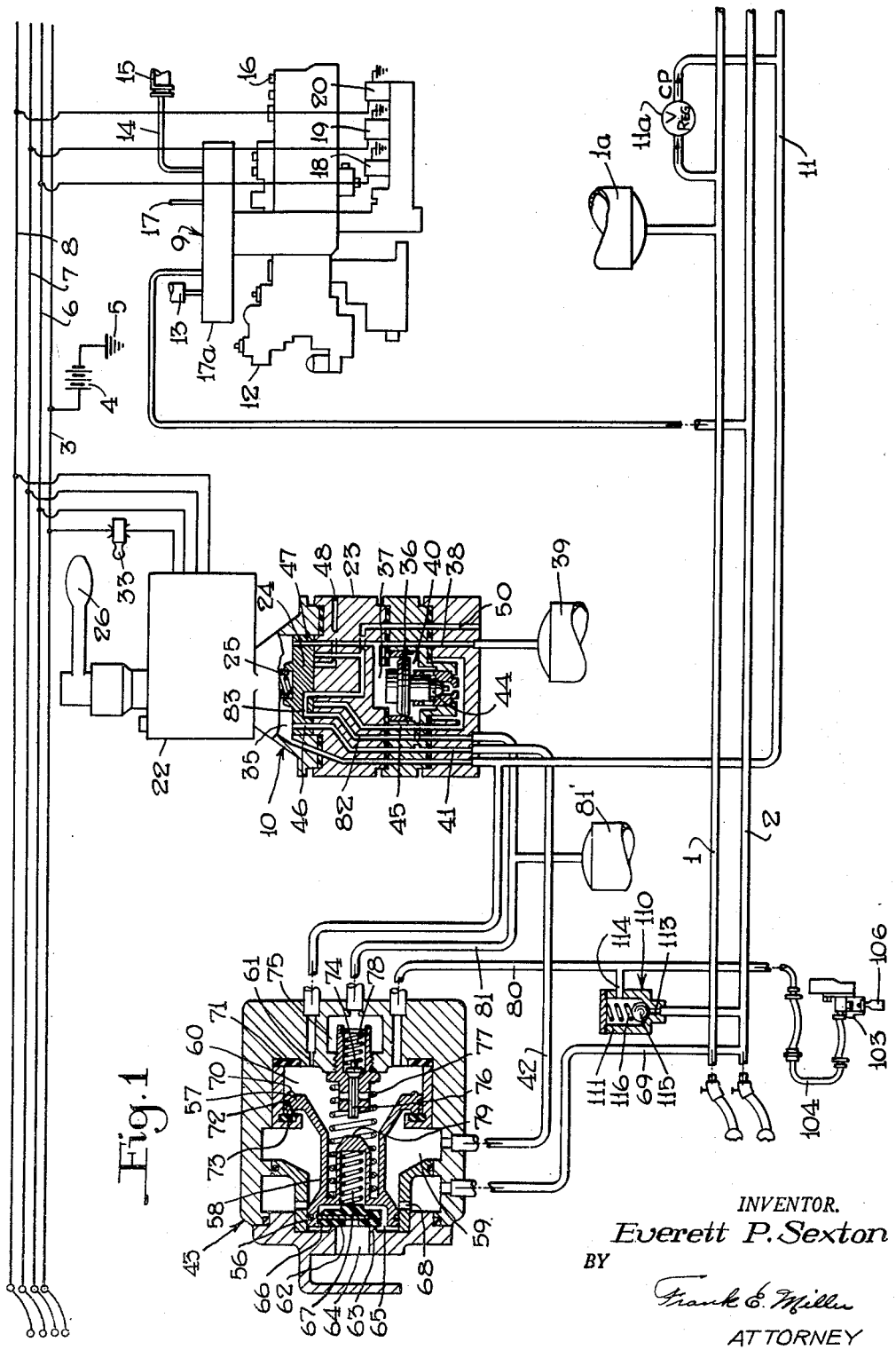

2,661,246

UNITED STATES PATENT OFFICE 2,661,246

FLUID PRESSURE BRAKE APPARATUS

Everett P. Sexton, East McKeesport, Pa., assignor to Westinghouse Air Brake Company, a corporation of Pennsylvania Application August 22, 1950, Serial No. 180,748

3 Claims. (Cl. 303—18)

This invention relates to fluid pressure brake equipment and more particularly to the electro-pneumatic type for use in connection with braking vehicles adapted to be controlled from either end and to be operated individually or in trains, such as subway cars or the like.

Certain vehicles in the above type of service have for years been equipped with Westinghouse Air Brake Company's "Amue" Electro-Pneumatic Brake equipment fully disclosed in their Instruction Pamphlet No. T-5051-13 dated February 1938. This equipment comprises two strip valve devices located at opposite sides of the vehicle, one on each truck, in such a manner that when a road bed trip is set against train movement, said trip will engage a normally depending handle of one of the trip valve devices and operate said device to an open position for effecting an emergency reduction in pressure in the usual brake pipe to thereby cause an emergency application of brakes on the vehicle or train, as the case may be, to promptly bring it to a stop. A trip valve device application of brakes usually occurs, as just described, when the operator's brake valve device is in release position supplying fluid under pressure to the brake pipe. It is undesirable to thus continue supply of fluid under pressure to the brake pipe which is open to atmosphere through the operated trip valve device, so it is customary to promptly move the brake valve device to lap position to cut off the supply of fluid under pressure to the brake pipe when such an application of brakes occurs. Before the car or train is again operated, the operator must leave his control station and go down along the road bed to the trip valve device which has operated to cause the emergency application of brakes and move the handle thereof back to its normally depending position to close the vent from the brake pipe, following which, he will return to his control station in the vehicle or train and move his brake valve device to release position to recharge the brake pipe and brake system for releasing the brakes on the vehicle or train after which he may proceed.

Recently new cars placed in the above type of service have been equipped with what is known as the "Smee" brake equipment which is substantially like that disclosed in the pending application of Samuel L. Williams et al., Serial No. 47,046, filed August 31, 1948, now Patent No. 2,591,224 issued April 1, 1952. This brake equipment, in contrast to the "Amue" brake equipment, embodies an automatically closing or resetting trip valve device, that is, a trip valve device which after operation by a road bed trip to vent the brake pipe for effecting an emergency application of brakes, automatically closes the vent from the brake pipe to eliminate the need for the operator to leave his control station for resetting the trip valve device, as required with the "Amue" brake equipment, to release the application of brakes. Further, with the "Smee" brake equipment the operator's brake valve device when in release position does not establish a brake pipe charging communication like the brake valve device in the "Amue" brake equipment so that it is not necessary, when a trip valve emergency application of brakes is effected, to move the brake valve device out of release position to avoid undesired waste of fluid under pressure. In order to release a trip valve emergency application of brakes with the "Smee" brake equipment it is however necessary to move the brake valve device to a full service position for recharging the brake pipe and certain other parts of the equipment to a certain pressure while retaining the brakes fully applied, after which the brake valve device will be returned to release position to release the brakes.

It is now desired to use the automatic closing type of trip valve device employed with the "Smee" brake equipment on vehicles equipped with the old "Amue" brake equipment in place of the manually resettable type which has been used to date but the mere substitution of one for the other will not be satisfactory since, on account of the brake valve device of the "Amue" brake equipment establishing a brake pipe charging communication in its release position, an emergency application of brakes initiated by operation of the automatic closing type of trip valve device could be promptly released unless the operator promptly moved the brake valve device out of its release position which can not be depended upon since the operator might be incapacitated.

The principal object of the invention is therefore to so modify the "Amue" brake equipment as to permit use of an automatic closing type of trip valve device therewith.

Other objects and advantages will become apparent from the following more detailed description of the invention.

In the accompanying drawings; Figs. 1 and 2, when the right-hand edge of Fig. 1 is matched to the left-hand edge of Fig. 2, is a diagrammatic view, partly in section and partly in outline, of an electro-pneumatic brake equipment embodying the invention; and Fig. 3 is a diagrammatic, development view of switch and valve portions of two operator's brake valve devices shown in Figs. 1 and 2.

DESCRIPTION

As shown in the drawings, 1 is a fluid pressure supply pipe adapted to be constantly supplied with fluid under pressure from any suitable source, such as a reservoir 1a; 2 is a brake pipe; 3 is an electric supply wire connected to one terminal of an electric supply such as a battery 4, the other terminal of which is grounded at 5; 6 is a brake release wire; 7 is a service application wire; and 8 is an emergency application wire, all of said pipes and wires being adapted to extend to opposite ends of a vehicle for connection with corresponding parts on another vehicle, in the case of a train. 9 is a brake controlling valve device and 10 and 10a are two identical operator's brake valve devices adapted to be located at opposite ends of the vehicle. 11 is a feed valve pipe connected to brake valve devices 10, 10a and adapted to be constantly supplied with fluid from the supply pipe 1 at a suitable reduced pressure through a constant pressure outlet or reducing valve device 11a. The parts so far enumerated are identical in structure and operation and are connected in the same manner as corresponding parts in the "Amue" brake equipment disclosed in the above referred to Instruction Pamphlet and since reference may be made to said Pamphlet for a detailed description of this equipment, only a brief description of these parts is necessary for an understanding of the invention which description will now be given.

The brake controlling valve device 9 comprises a service application valve device 12 adapted to respond to a service reduction in pressure in the brake pipe 2 to supply fluid from a precharged auxiliary reservoir 13, at a pressure corresponding to the degree of such reduction, to a pipe 14 which, for illustration, may be connected directly to a brake cylinder device 15 whereby such pressure may operate said brake cylinder device to effect an application of brakes. The brake controlling valve device 9 further comprises an emergency application valve device 16 arranged to operate upon an emergency reduction in pressure in brake pipe 2 to supply fluid from a source, such as a pipe 17, to the brake cylinder device 15 for effecting an emergency application of brakes. Upon restoration of pressure in brake pipe 2 the service application valve device 12 and emergency application valve device 16 are adapted to operate to their normal position for releasing fluid under pressure from the brake cylinder device 15 and for recharging the auxiliary reservoir 13 with fluid under pressure from the brake pipe.

The service application valve device 12 and emergency application valve device 16 are mounted on opposite sides of a pipe bracket 17a with which there is associated a magnet valve portion comprising a release magnet 18, a service application magnet 19 and an emergency application magnet 20, said magnets being connected to the release, service and emergency wires 6, 7 and 8, respectively. Upon supply of electic current from battery 4 to the release wire 6 and service wire 7 the release magnet 18 and service magnet 19 are adapted to be energized to, respectively, close a vent from the brake cylinder device 15 and to supply fluid under pressure to said brake cylinder device for effecting a service application of brakes on the vehicle. Upon energization of the release wire 6 and emergency wire 8 by current from battery 4 the release magnet 18 and emergency magnet 20 are adapted to be energized for, respectively, closing a vent from the brake cylinder device the same as in effecting a service application of brakes, and for also supplying fluid under pressure to the brake cylinder device 15 for effecting an emergency application of brakes. Supply of electric current from battery 4 only to the release wire 6 subsequent to effecting a service application of brakes will maintain the vent from the brake cylinder device 15 closed to thereby hold an application of brakes in effect.

The brake valve devices 10 and 10a each comprises an electric switch portion 22 and a valve portion 23 including a rotary valve 24, said switch portion and rotary valve being arranged for operation in unison by a common shaft 25 adapted to be turned by an operator's removable handle 26. Only one handle 26 is provided on a vehicle and is applied to the brake valve device at the selected control end of the vehicle, as shown in the drawing.

The brake valve handle 26, and thereby the electric portion 22 and rotary valve 24 in each brake valve device has spaced apart, "Release," "Electric Holding," "Handle Off," "Lap," "Service" and "Emergency" positions, as designated in Fig. 3 by legends. The brake valve handle 26 is shown in Fig. 1 in its Release position and in Fig. 2 in its "Handle Off" position.

The electric portion 22 of each brake valve device 10 and 10a comprises four spaced apart fixed contacts 28, 29, 30 and 31 and a movable contact 32 (Fig. 3) arranged to cooperate with said fixed contacts according to different positions of the brake valve handle 26, as will be presently described. The fixed contact 28 is adapted to be connected to the current supply wire 3 by a removable plug switch 33 only one of which is provided on the vehicle and adapted to be used at the end of the vehicle from which it is desired to control the vehicle brakes. At the opposite or non-control end of the vehicle the fixed contact 28 in the brake valve device will not therefore be connected to the current supply wire 3. The contacts 29, 30 and 31 at both brake valve devices 10 and 10a are connected respectively to the release wire 6, the service application wire 7 and the emergency application wire 8.

In each brake valve device 10, 10a the rotary valve 24 is contained in a chamber 35 which is constantly supplied with fluid under pressure from the feed valve pipe 11. Each brake valve device further comprises an equalizing discharge valve device embodying a piston 36 subject on one side to pressure of fluid in a chamber 37 which is connected to a passage 38 leading in one direction to the seat of rotary valve 24 and in the opposite direction to an equalizing reservoir 39. At the opposite side of piston 36 is a chamber 40 connected to a passage 41 leading to the seat of rotary valve 24 and also connected to a brake pipe charging pipe 42 adapted to be normally open to brake pipe 2 through a brake application control valve device 43 at the brake valve device 10, or a brake application control valve device 43a at the brake valve device 10a. The valve devices 43, 43a constitute a part of the invention and will be described subsequently. Carried by piston 36 is a brake pipe discharge valve 44 arranged to control communication between chamber 40, and thereby the brake pipe 2, and an exhaust passage 45 leading to the seat of the rotary valve 24.

Assuming that the brake valve device 10a is at the non-control end of the vehicle and in Handle-Off position and that the plug switch 33 is applied only at the opposite or control end, it will be noted that the current supply via wire 3 to said brake valve device is cut off and the release contact 29, service contact 30 and emergency contact 31 are disconnected from each other, while at the rotary valve 24, passage 41 from the brake pipe 2, passage 45 from the brake pipe discharge valve 44 and passage 38 from the equalizing reservoir 39 are all lapped by said rotary valve, so as to provide for control of brakes only by the brake valve device 10 at the opposite or selected control end of the vehicle.

With the brake valve device 10 at the selected control end of the vehicle in Release position, in which it is shown in Fig. 1, a port 46 through the rotary valve opens chamber 35 to the brake pipe passage 41, and assuming that said chamber is charged with fluid under pressure from the supply pipe 1, such fluid will flow through said port to said passage and thence through the brake application valve device 43 to the brake pipe 2 to charge same and to thereby actuate the service application valve device 12 and emergency application valve device 16 of the brake controlling valve device 9 to their normal or brake release positions. Chamber 40 below the equalizing piston 36 being connected to the brake pipe passage 41 will also become charged with fluid at the same pressure as present in the brake pipe 2.

Fluid under pressure from the rotary valve chamber 35 in brake valve device 10 will also flow through a port 47 in rotary valve 24 to passage 38 and thence to the equalizing reservoir 39 and equalizing piston chamber 37 to charge said reservoir and chamber with fluid at the same pressure as in the brake pipe. With the equalizing piston 36 thus subject on opposite sides to the same pressures of fluid, said piston will hold the discharge valve 44 seated.

Also in Release position of the brake valve device 10 no electrical circuits are established in the electric portion 22 whereby the release magnet 18 will be deenergized for venting the brake cylinder device 15.

Now let it be assumed that the handle 26 of the brake valve device 10 is turned to Service position. The release magnet 18 will thereby be energized to close the brake cylinder release vent and the service application magnet 19 will also be energized to effect an electro-pneumatic service application of brakes. The rotary valve 24 will also be in service position in which the brake pipe passage 41 and equalizing piston chamber 40 are disconnected from the fluid pressure supply in rotary valve chamber 35 and connected by way of a cavity 47a to an exhaust passage 48, and at the same time a cavity 49 in the rotary valve will connect equalizing reservoir passage 38 to an exhaust passage 50 to which the discharge valve passage 45 will also be open via a cavity 51 in the rotary valve. The consequent venting of fluid under pressure from the equalizing reservoir 39 and piston chamber 37 will reduce such pressure below the brake pipe pressure in chamber 40, as a result of which, the equalizing piston 36 will move up to unseat the discharge valve 44 whereupon fluid under pressure will also be vented from the brake pipe 2 past said valve to passage 45 and thence through cavity 51 in the rotary valve and exhaust passage 50 to atmosphere. It will be noted that fluid under pressure is vented from the brake pipe 2 via cavity 47a in the rotary valve as well as past the discharge valve 44, the vent via cavity 47a initiating the reduction in brake pipe pressure sooner than would be the case past said discharge valve, but due to the relatively large volume of the brake pipe 2 on a vehicle as compared to that of the equalizing reservoir 39, the reduction in pressure in said reservoir and equalizing piston chamber 37 will overtake and then lead the reduction in brake pipe pressure upon opening of the discharge valve 44 to permit the reduction in pressure in said reservoir to control the degree of reduction in pressure in the brake pipe 2, as will be later brought out.

If the service magnet 19 becomes energized and effects an application of brakes as intended upon movement of the brake valve handle 26 to service position, the reduction in pressure in brake pipe 2 effected as just described will be to no avail, but in case such an application of brakes fails to materialize, then the service portion 12 of the brake controlling valve device 9 will operate in response to the reduction in pressure in brake pipe 2 to effect an application of brakes.

When a desired degree of service brake application is obtained the brake valve handle 26 will be moved to Lap position to effect deenergization of the service application magnet 19 while holding the release magnet 18 energized. The supply of fluid to the brake cylinder device 15 will thereby be cut off while the release magnet remaining energized will hold the pressure in said brake cylinder device to maintain the brakes applied.

Also in "Lap" position of handle 26 the brake pipe 2 will be disconnected from the exhaust passage 48, the equalizing reservoir 39 will be disconnected from the exhaust passage 50 but the brake pipe discharge valve passage 45 will remain open to the exhaust passage 50 via cavity 50a. The reduction in pressure in the equalizing reservoir 39 and piston chamber 37 will thereby be terminated, but brake pipe pressure acting on the opposite side of the equalizing piston 36 will hold the discharge valve 44 open and permit fluid under pressure to continue to release from the brake pipe 2 until the pressure therein becomes reduced to substantially that still effective in equalizing piston chamber 37 whereupon the piston 36 will be operated to seat the discharge valve 44. If the application of brakes is due to the reduction in pressure thus effected in the brake pipe, the degree of such application will be correspondingly limited by operation of the service application valve device 12 in the well-known manner.

If it is desired to effect an increased application of brakes, the brake valve handle 26 may be moved from Lap position again to Service position to increase the application to the desired degree, and then be moved back to Lap position as will be clear from the above description.

If due to energization of the release magnet 18 and service magnet 19 the brakes on the vehicle are applied and it is desired to restore the pressure in brake pipe 2 back to normal while holding the brakes thus applied, the brake valve handle 26 will be moved to Holding position in which the release magnet 18 will remain energized to hold the brakes applied, and in which via ports 46 and 47 in the rotary valve 24 the brake pipe 2 and equalizing reservoir 39 and thereby chambers 37 and 40 to opposite sides of the equalizing piston 36 will be recharged with fluid to the pressure normally carried in the brake pipe. It will be apparent that if the application of brakes were due to the previous reduction in pressure in brake pipe 2, the recharging of the brake pipe in "Holding" position would release such application, that is, the "Holding" position is only for the purpose above described and is of no account when the application is due to a reduction in pressure in brake pipe 2.

In order to release an application of brakes, the brake valve handle 26 will be returned to "Release" position for deenergizing the release magnet 18 and for recharging the brake pipe 2 in the same manner as in "Holding" position, if not already so charged, whereupon the release of brakes will occur due either to operation of said magnet or the increase in pressure in the brake pipe, as the case may be.

If it is desired to effect an emergency application of brakes the brake valve handle 26 will be moved to "Emergency" position for energizing the release magnet 18 and emergency magnet 20 and for at the same time opening the brake pipe passage 41 to the exhaust passage 50 via cavity 52 in the rotary valve 24 whereby, in either case, an emergency reduction in brake pipe pressure will occur to cause operation of the emergency portion 16 of the brake controlling valve device 9 to effect an emergency application of brakes on the vehicle.

In order to release the brakes after an emergency application, the brake valve handle 26 may be returned to "Release" position, or first to "Holding" position, if desired, whereupon the release will occur in the same manner as above described.

The brake application control valve devices 43, 43a are identical, each comprising two spaced apart and coaxially arranged pistons 56, 57 connected together by a stem 58. The two pistons 56, 57 cooperate to form between them a chamber 59 open to the respective brake pipe charging pipe 42; while at the opposite side of piston 57 there is a brake application control chamber 60 open to the feed valve pipe 11 through a restriction or choke 61 whereby there is adapted to be a constant reduced flow of fluid under pressure to chamber 60 from said pipe. Disposed in a cavity in the outer face of piston 56 is a valve 62 arranged to cooperate with an annular seat rib 63 in the casing to control communication between an atmospheric passage 64 encircled by said rib and an annular cavity 65 encircling said rib. A shoulder 66 projecting from piston 56 is arranged to contact valve 62 to pull same from its seat on rib 63 upon movement of said piston away from said seat. A spring 67 resiliently urges the valve 62 toward shoulder 66.

With the valve 62 engaging seat rib 63 the piston 56 is adapted to open to chamber 59 a plurality of ports 68 which are connected by a pipe 69 to the brake pipe 2. The pistons 56, 57 are adapted to move from their normal position, in which they are shown in the drawing, to a brake pipe venting position defined by sealing engagement of a rib 70 in the outer face of piston 57 with a gasket 71. In this venting position the valve 62 is adapted to be unseated and the piston 56 disposed at the side of ports 68 opposite that in which it is shown in the drawing to thereby close communication between chamber 59 and the pipe 69 and to open said pipe to the atmospheric passage 64. In the normal position of piston 57 an annular rib 72 on its inner face is adapted to seal against a gasket 73, the sealing of the ribs 70 and 72 with the respective gaskets 71 and 73 being adapted to prevent leakage of fluid under pressure from chamber 60 to chamber 59 in the different positions of piston 57. A spring 77 contained in chamber 60 acts on the piston 56 for urging said piston and the piston 57 to their normal position.

Each brake application control valve device 43, 43a further comprises a lock valve 74 contained in a chamber 75 for controlling communication between said chamber and the brake application control chamber 60 through a bore in which there is slidably mounted a fluted stem 76 of said valve. A spring 78 acts on the valve 74 for urging it toward its seat. The valve 74 and its stem 76 are arranged in coaxial relation to the piston 57, and said stem extends into the brake application control chamber 60 for engagement by a projection 79 from piston 56 to unseat said valve upon movement of the pistons 56, 57 to open the valve 62. With the valve 62 seated the projection 79 is adapted to be spaced from valve 74 to ensure seating of the latter valve by spring 78.

In each brake application control valve device 43, 43a the lock valve chamber 75 is connected by a lock control pipe 81 to a passage 82 in the respective brake valve device 10, 10a and, according to the invention, to a volume chamber 81' for reasons which will become obvious hereinafter. The passage 82 in each brake valve device 10, 10a constitutes a passage already present but not now used in the brake valve devices of the "Amue" brake equipment and the rotary valve 24 of said brake valve device is also provided with passages 83, 84 for connecting passage 82 to the exhaust passage 50 in, respectively, the "Release" and "Handle Off" positions of said rotary valve, said rotary valve lapping passage 82 in all other positions of said rotary valve. Also according to a feature of the invention, the chamber 60 in each brake application control valve device 43, 43a is connected by a brake application control pipe 80 and a conduit 104 to a respective automatic closing trip valve device 103, 103a, one at each end of the vehicle. The brake pipe 2 has a connection with the respective brake application control pipe 80 at each end of the vehicle by way of a respective spring biased check valve device 110 which will allow flow of fluid from the brake pipe 2 to the control pipe 80 upon establishment of a certain preponderance in pressure in the former pipe over that in the latter and will prevent flow of fluid in the reverse direction.

The trip valve devices 103, 103a are identical to those employed in the "Smee" brake equipment heretofore referred to, each trip valve device comprising a normally depending arm 106 adapted upon engagement with a road bed trip (not shown) to be swung out of its depending position to open the conduit 104, hence control pipe 80, to atmosphere, and which is adapted to automatically return to its depending position and close communication between brake application control pipe 80 and atmosphere when pressure of fluid in the control pipe is reduced to a chosen low degree.

Each of the spring-loaded check valve devices, for sake of illustration, may comprise a casing 111 having a chamber 112 therein open to the exterior of the casing at an inlet 113 and an outlet 114. The inlet 113 is connected to a branch of the brake pipe 2 and the outlet 114 is connected to a branch of the pipe 80. Provided in the chamber 112 is a ball check valve 115 which is urged by a compression spring 116 toward a seated position in which it is shown in the drawing for closing the chamber 112, hence pipe 80, to the brake pipe 2. Upon a certain preponderance in pressure in the brake pipe 2 over that in the brake application control pipe 80, to be described hereinafter, the action of the spring 116 will be overcome and the ball check valve will unseat; opening the brake control pipe 2 to the pipe 80 via the chamber 112.

OPERATION

In operation, let it be assumed that the handle 26 of the controlling brake valve device 10 is in "Release" position in which it is shown in Fig. 1, that the other brake valve device 10a is in "Handle Off" position in which it is shown in Fig. 2, and that the brake pipe 2 is charged with fluid under pressure (in a manner which later will be described) along with the feed valve pipe 11, and that the brakes on the vehicle are released.

Supply of fluid under pressure from the feed valve pipe 11 will build up a fluid pressure in chamber 35 in the controlling brake valve device 10 and flowing via choke 61 from pipe 11 will build up pressure of fluid in the brake application control chamber 60 in each of the brake application control valve devices 43 and 43a equal to that pressure of fluid supplied to the respective chamber 59 in device 43 by way of brake pipe charging pipe 42, and in the controlling brake valve device 10, passage 41, port 46 and the chamber 35 which is charged with fluid under pressure from feed valve pipe 11 as previously mentioned. As will be appreciated from previous description, with equalization of pressure of fluid in chambers 59 and 60 in brake application control valve device 43, the respective pistons 56, 57 will be caused to assume their normal positions, in which they are shown in the drawing, by action of the spring 77 for opening communication between the brake pipe 2 and chamber 59.

In the brake application control valve device 43a the chamber 59 is disconnected from the feed valve pipe 11 via pipe 42a and passage 41 in the brake valve device 10a by the respective rotary valve 24, in its "Handle Off" position, which blanks off passage 41. Pressure of fluid supplied from feed valve pipe 11 to the respective brake application control chamber 60 in the brake valve device 10a, being equal to or greater than the pressure in respective chamber 59 will therefore allow spring 77 to so position pistons 56, 57 as to connect chamber 59 to the brake pipe 2.

From the feed valve pipe 11, fluid under pressure will flow, in the controlling brake valve device 10, from the rotary valve chamber 35, through port 46, registering passage 41, the brake pipe charging pipe 42, the chamber 59 in the brake application valve device 43 and pipe 69 into the brake pipe 2 to charge same.

Chamber 75 in the brake application valve device 43, and the respective volume chamber 81' will be vented to atmosphere at this time by way of pipe 81, and, in the controlling brake valve 10, the passage 82, port 83 in rotary valve 24 and the passage 50. In the brake application control valve device 43a, the corresponding chamber 75 will be closed from the atmosphere by the rotary valve 24 in the brake control valve device 10a in Handle Off position.

Assume the trip valve devices 103, 103a to be in their respective closed positions so that with both the brake application control chamber 60 in device 43 and the brake pipe 2 charged to the same and feed valve pipe pressure, fluid pressure forces across the check valve 115 will be equal and such valve will be seated by the spring 116, closing off the brake application control pipe 80 from the brake pipe 2.

With chamber 59 in the brake application control valve device 43 or 43a at the control end of the vehicle thus open to brake pipe 2, the brakes on the vehicle may be controlled by operation of the respective brake valve device 10 or 10a in the same manner as before described.

With the brakes on the vehicle released, under control of the brake valve device 10 and the vehicle in motion, let it be assumed that the arm 106 of the trip valve device 103 is struck by a track trip and swung out of its normal depending position to freely vent the pipe 104, connected brake application control pipe 80, and hence the brake application control chamber 60 in the brake application control valve device 43 to atmosphere.

With the brake application control pipe 80 thus freely vented to atmosphere by way of the trip valve device 103, fluid under pressure will flow from the brake application control chamber 60 of the brake application control valve device 43 at a rate which so exceeds the rate of supply of fluid under pressure from feed valve pipe 11 via choked communication 61 as to reduce the pressure sufficiently below the opposing brake pipe pressure in chamber 59 that a differential in the opposing fluid pressures on piston 57 will be obtained which will move said piston 56 against spring 77 to the position defined by contact between the piston rib 70 and gasket 71. This operation of the brake application control valve device 43 will close the respective communication between the brake pipe 2 and the respective chamber 59 and open said brake pipe to atmosphere past the open valve 62 therein to effect an emergency reduction in brake pipe pressure.

With the non-controlling brake valve device 10a in Handle Off position lapping off the respective communication between the feed valve pipe 11 and chamber 59 in the brake application valve 43a at the time of the closing of the communication between the brake pipe 2 and chamber 59 in the application control valve device 43, further supply of fluid under pressure is cut off to the brake pipe from pipe 42 via the brake valve device 10 which is still in Release position, whereby fluid under pressure will not be supplied to the brake pipe to release the emergency brake application resultant from the emergency reduction in brake pipe pressure after automatic closing of the trip valve device 103.

If, for any reason, venting of the brake application control chamber 60 in the device 43 via the trip valve device 103 should fail to effect venting of the brake pipe 2, that is, should the piston 57 fail to respond to the reduction in pressure in said chamber 60, the preponderance in pressure in the brake pipe 2 over that in the brake application control pipe 80 will cause unseating of the spring loaded check valve 115 and venting of fluid under pressure from the brake pipe will occur via brake application control pipe 80 and the trip valve device 103 at a rate greater than it is supplied to the brake pipe from the feed valve pipe 11 via brake control valve device 10, brake pipe charging pipe 42, and chamber 59 in device 43. Such venting of fluid under pressure from the brake pipe will cause an emergency reduction in brake pipe pressure and a consequent emergency application of the brakes on the vehicle. Under such conditions, however, if the brake valve device 10 is allowed to remain in Release position, when the trip valve device 103 automatically closes, the fluid under pressure supplied from the feed valve 10 to the brake pipe 2 will recharge the brake pipe and cause release of the brakes. However, such unintentional release of the brakes may be prevented by movement of the brake valve handle 26 to Lap position to cut off supply of fluid under pressure from the feed valve pipe 11 to the brake pipe via brake pipe charging pipe 42, or to either Service or Emergency position to likewise cut off such supply and simultaneously also vent the brake pipe to atmosphere via passage 48 or 50, respectively.

With normal operation of the application valve device 43, resultant local venting of the brake pipe 2 by way of the respective atmospheric passage 64 in said device will preclude establishment of a preponderance in brake pipe pressure over that in the respective brake application control pipe 80 vented via the trip valve device 103 sufficient to unseat the respective spring loaded check valve 115, so that the check valve 115 will remain seated during such operation.

The operation of the brake application control valve device 43, in response to emergency operation of the trip valve device 103 will also unseat the respective lock valve 74, thereby opening the respective brake application control chamber 60 to passage 82 in the connected brake valve device 10. The controlling brake valve device 10, being in Release position opens passage 82 to atmosphere via passage 50, so that the respective brake application control chamber 60 in the brake application control valve device 43 will thereby be so vented, allowing any fluid under pressure supplied to the respective chamber 60 from the feed valve pipe 11 via respective restricted communication 61 to vent to atmosphere, thereby assuring that feed valve pressure in the respective chamber 59 will hold the respective piston 57 in the position in which the brake pipe 2 remains vented via respective atmospheric passage 64.

At the non-control brake valve device 10a in its Handle Off position, the respective passage 82, hence the respective brake application control chamber 60 in device 43a, is closed to atmosphere by a plug 85 in the respective rotary valve passage 84, so that feed valve pressure in said chamber 60 will be maintained and the respective piston 59 held so positioned that the brake pipe 2 will be closed off from the respective atmospheric passage 64 and connected to the respective chamber 59, pipe 42, and passage 41 in device 10a which passage is closed therein by the respective rotary valve 24.

So long as the controlling brake valve device 10 remains in its Release position with the non-controlling brake valve device 10a in its Handle Off position, feed valve supply will be cut off from the brake pipe 2 which will remain vented by way of the unseated valve 62 in the application control valve device 43 and the emergency application of brakes on the vehicle will be maintained. Subsequent automatic closure of the trip valve device 103 will close off the brake application control pipe 80 from venting to atmosphere via said trip valve device, but the venting of the brake application control chamber 60 via the unseated lock valve 74 in device 43 will maintain said chamber so vented via device 10 in its Release position.

With the brake pipe 2 vented due to operation of the trip valve device 103 and the brakes on the vehicle applied as a result, and with the controlling brake valve device 10 still in Release position it will be noted that there will be a continuous undesired leak of fluid under pressure from the brake system to atmosphere through choke 61 and past the open lock valve 74 in the brake application control valve device 43 and thence through said brake valve device.

In order to stop such loss of fluid under pressure, the handle 26 of the controlling brake valve device 10 may be moved to "Lap" position to close communication to passage 82 and to also cut off the supply of fluid under pressure to passage 41 and chamber 59 in the brake application control valve device 43. With passage 82 in the brake valve device 10 thus lapped, fluid under pressure supplied through choke 61 to the brake application control chamber 60 in the brake application control valve device 43 and via lock control pipe 81 to volume chamber 81' will build up the pressure therein eventually to that present in the feed valve pipe 11, and when sufficiently increased, spring 77 will return the parts of said brake application valve device to their normal position for closing the brake pipe vent valve 62, opening communication between the connected brake pipe charging pipe 42 and the brake pipe 2 and permitting closure of the lock valve 74, but with the brake valve device in Lap position there will be no supply of fluid under pressure to said brake pipe charging pipe 42 and the brake pipe 2.

As will be appreciated from subsequent description, the volume chamber 81' so delays build up of pressure in the brake application control chamber 60 that sufficient time elapses for an emergency application of the brakes to have stopped the vehicle before the piston 57 in device 43 is returned to normal position to connect the brake pipe 2 to the break pipe charging pipe 42 and thereby establish a communication through which the brake pipe may be recharged to release the brakes.

At the non-control end of the vehicle, the parts of the brake application control valve device 43a will remain in their normal positions following the trip valve emergency application of brakes, as before mentioned, maintaining the brake pipe 2 connected to the brake control valve device 10a in its Handle Off position and thereby cut-off from feed valve supply pipe 11.

With return of the application control valve device 43 to its normal position and consequent establishment of the connection between the brake pipe 2 and the brake valve device 10 via brake pipe charging pipe 42, the brakes on the vehicle will remain applied so long as said brake device 10 remains in its Lap position cutting off said brake pipe charging pipe 42, hence brake pipe 2, from feed valve supply pipe 11.

Whenever the operator desires to release the application of brakes effected by operation of the trip valve device 103, he will turn handle 26 of the controlling brake valve device 10 from "Lap" position to Release position in which fluid under pressure will again be supplied to the connected brake pipe charging pipe 42 from which it will flow through the brake application control valve device 43 to the brake pipe for recharging same and thereby effecting operation of the brake controlling valve device 9 to release the vehicle brakes. The fluid under pressure thus supplied to the brake pipe at the control end of the vehicle will flow to the non-control end and through ports 68 to chamber 59 in the brake application control valve device 43a but will have no effect thereon since the opposite side of the respective piston 57 is already subject in the brake application control chamber 69 to fluid pressure from the feed valve pipe 11.

Since the brake valve device 10, 10a and other parts of the brake equipment at the two ends of the vehicle are identical, the operation of the equipment in response to operation of the trip valve device 103a when the control end of the vehicle is at brake valve device 10a will be the same as above described when the brake valve device 10 was the control brake valve device, as it is believed will be evident.

SUMMARY

From the above description it will be seen now that by the addition and arrangement of the brake application control valve devices 43, 43a, the volume chambers 81', and the check valve devices 110 to the "Amue" brake equipment, as above described, the automatic closing trip valve devices 103, 103a may be used in connection with said equipment since the supply of fluid under pressure to the brake pipe will be cut off by one or the other of said brake application valve devices in response to operation of a respective trip valve device, thereby assuring that the brakes on the vehicle will apply and not be undesirably released upon automatic closure of said trip valve device. With these additions to the "Amue" equipment, the plug 85 in the rotary valve of the brake valve devices is necessary in order to prevent fluid under pressure supplied to the brake pipe by the controlling brake valve device from dissipating to atmosphere by way of the non-controlling brake valve device in its "Handle Off" position.

Having now described my invention, what I claim as new and desire to secure by Letters Patent, is:

1. In a fluid pressure brake equipment, in combination, a source of fluid under pressure, a brake pipe, a feed valve pipe constantly availed of fluid under pressure from said source, a brake pipe charging pipe, a brake application control pipe, a lock control pipe, an operator's brake valve device having a release position for establishing a fluid pressure supply communication between said brake pipe charging pipe and said feed valve pipe and an exhaust communication between said lock control pipe and atmosphere and having a lap position for closing both said supply communication and said exhaust communication, a brake application control valve device having one chamber in restricted communication with said feed valve pipe and unrestricted communication with said brake application control pipe and having a second chamber connected to said brake pipe charging pipe, said brake application control valve device being operable upon substantial equalization of pressure in said one chamber with pressure in said second chamber to a brake release position for opening said brake pipe to said brake pipe charging pipe and being operable upon a reduction in pressure in said one chamber relative to that in said second chamber to a brake application position for opening a vent from said brake pipe to atmosphere and for also opening said one chamber to said lock control pipe, and automatically closing road bed operable trip valve means for venting said brake application control pipe to atmosphere.

2. The combination as set forth in claim 1, including a volume reservoir connected to said lock control pipe to delay build up of pressure in said one chamber from restricted flow of fluid under pressure from said feed valve pipe when said brake application control valve device is in its brake application position, said trip valve device is closed, and said brake valve device is in its lap position closing off said lock control pipe from the atmosphere.

3. The combination as set forth in claim 1, including spring loaded check valve means having an inlet connected to said brake pipe and an outlet connected to said brake application control pipe to allow for release of fluid under pressure from said brake pipe in response to establishment of a certain differential in pressure between said brake pipe and said brake application control pipe resultant from operation of said trip valve means and failure of operation of said brake application control valve device.

EVERETT P. SEXTON.

References Cited in the file of this patent

UNITED STATES PATENTS

| Number | Name | Date |
|---|---|---|
| 1,104,823 | Murphy | July 28, 1914 |
| 1,129,319 | Turner | Feb. 23, 1915 |
| 1,130,447 | Turner | Mar. 2, 1915 |
| 1,192,331 | Lewis | July 25, 1916 |
| 1,538,932 | Farmer | May 26, 1925 |
| 1,694,193 | Sproull | Dec. 4, 1928 |
| 1,855,595 | Bushnell | Apr. 26, 1932 |